March 1, 1932.  S. G. AVERELL  1,847,231
SPRING SCALE
Filed June 6, 1929
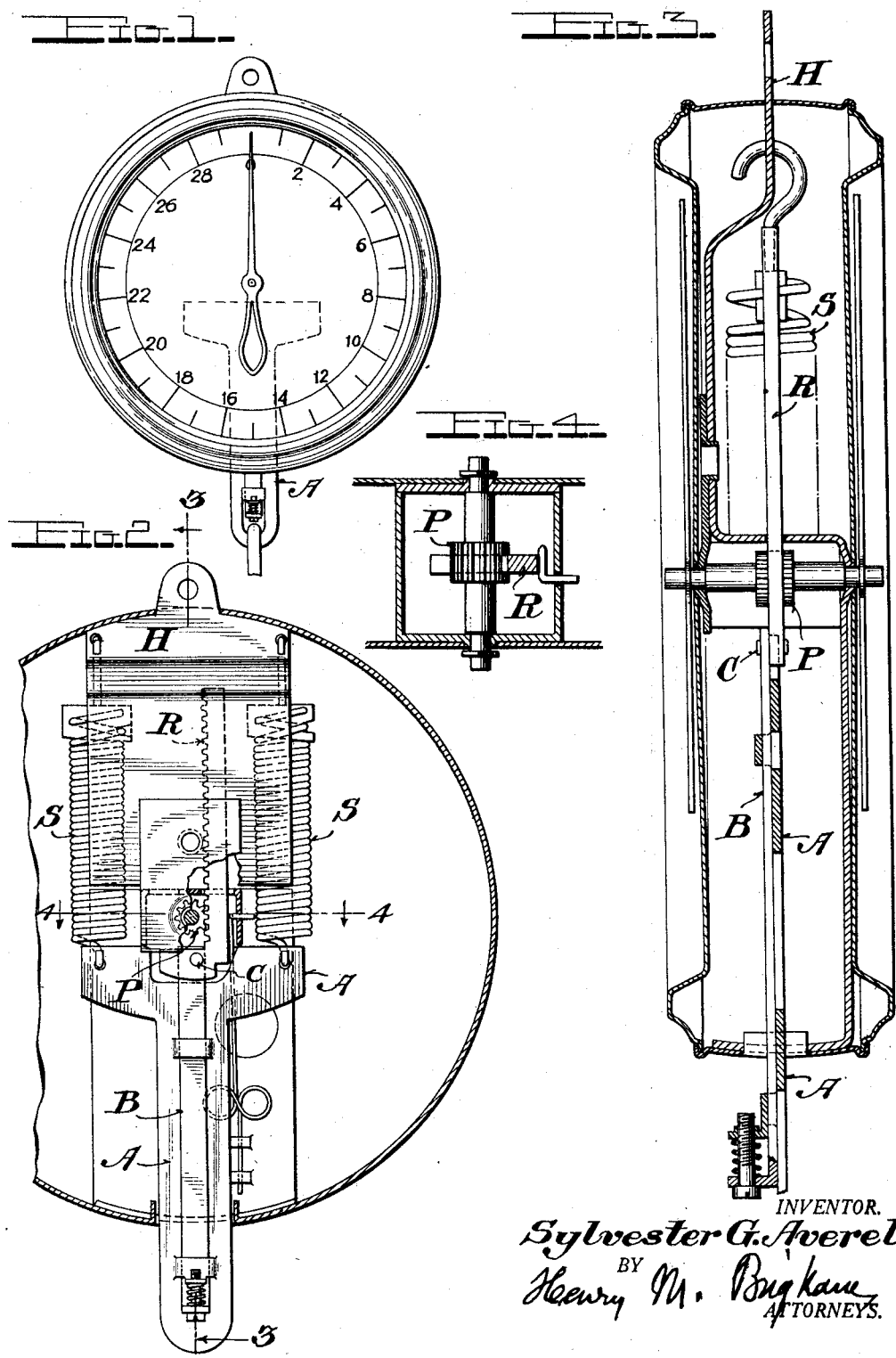
INVENTOR.
Sylvester G. Averell,
BY Henry M. Bingham
ATTORNEYS.

Patented Mar. 1, 1932

1,847,231

UNITED STATES PATENT OFFICE

SYLVESTER G. AVERELL, OF NEW YORK, N. Y., ASSIGNOR TO JOHN CHATILLON & SONS, OF NEW YORK, N. Y., A CORPORATION OF NEW YORK

SPRING SCALE

Application filed June 6, 1929. Serial No. 368,852.

This invention relates to scales, and more particularly to scales or balances of the spring type.

Spring balance scales as heretofore made have been rendered inaccurate because of the longitudinal expansion or contraction of the wire of the spring due to changes in temperature and to changes in stiffness of the springs also due to changes in temperature which caused such scales to inaccurately register the weight of commodities weighed thereon. These two causes combine to produce a multiplication of error in the reading of the scale, causing them to under-indicate at low temperatures and over-indicate at high temperatures.

In the manufacture of spring scales of a theoretically correct standard, it is not only necessary to provide means for correcting for the so-called changes of stiffness of the spring, but also for correcting the zero point.

Accordingly, a primary object of the present invention is to provide a spring scale which will automatically correct the indicator for the zero point as well as substantially compensate through the indicator for the varying stiffness of the springs due to changes in temperature. That is to say, it is proposed to provide a spring scale including means, preferably a single element, for correcting the reading of the indicator for the changing length of the wire of the spring, and for substantially compensating for the errors of the indicator due to the changes in the stiffness of the spring due to changes in temperature.

The inaccuracy of springs due to temperature is caused by the increase or decrease in length of the wire of the spring which affects the zero point and a change in the stiffness of the spring which does not substantially affect the zero point but does affect the reading on the scale. The error of the zero reading of the indicator is constant at any given temperature at all loads but the indicator error due to change of stiffness of the spring increases approximately in direct proportion to the load which greatly complicates the problem of producing compensating elements to correct both defects and particularly where a single element corrects both inaccuracies.

A preferred and practical embodiment of the invention is shown in the accompanying drawings in which:

Figure 1 is a front elevation of a scale embodying the present improvements.

Fig. 2 is a detail elevation of the scale mechanism with the dial plate removed.

Fig. 3 is an enlarged vertical sectional view of the construction shown in Fig. 1.

Fig. 4 is a detail horizontal sectional view taken on the line 4—4 of Fig. 2 showing the rack and pinion at the point of engagement.

Similar reference characters designate corresponding parts throughout the several figures of the drawings.

As previously indicated, the present invention contemplates the utilization of a simple and practical means, preferably in the form of a single element for automatically correcting the reading of the indicator for the zero point as well as for substantially compensating for the variation in the stiffness of the spring or springs.

To that end I use a novel type of rack for engaging with the pinion on the dial shaft, the material of which the said rack is composed having a very high co-efficient of expansion as compared to the co-efficient of expansion of the steel wire of the scale springs.

The problem which confronted me was to find a material for my rack whose co-efficient of expansion was such that it would correct the error in the springs due to changes in the stiffness of the springs caused by changes in temperatures and to pivot such rack on the runner at such a distance below its point of contact with the rack when the scale was under no load that the expansion of the rack between the pinion and its pivot would correct the scale reading for the zero point at all temperatures.

I have found that acetate sheet stock manufactured by The Celluloid Company of America is a suitable material for my rack which will accurately correct the zero reading and substantially compensate for changes in stiffness of the spring.

By way of illustrating the general theory of the invention before proceeding to a more detailed description thereof, attention is directed to Fig. 2 of the drawings wherein certain elements of the scale mechanism are designated for convenience of reference. The runner is designated as A and has mounted thereon a rack carrier B to which the rack R is pivoted as at C. The runner A is suspended on the springs S which are supported at the top on a hanger designated as H and the rack R engages with the pinion P on the shaft of the indicator.

The distance for any given setting between the center of the pivot C and the axis of the pinion P is constant at no load at the temperature for which the rack carrier B is adjusted. If the temperature rises, the length of the wire of the spring will increase which will permit the runner to drop down proportionately. This increase in temperature will also cause the single element or rack R which has a much higher co-efficient of expansion than the wire of spring to expand and maintain the indicator at zero. In that connection the single element or rack has but one effective movement, that is a movement in the direction of its length as distinguished from an expansion movement as well as a bending movement. If the runner is then subjected to a load the stiffness of the springs S will be reduced and they will be flexed beyond the normal flexure for the temperature for which the scale was adjusted but the longitudinal expansion of the rack will also automatically correct the reading of the indicator thereby effecting a correction of the zero reading of the indicator without loading and also substantially compensate for errors in the reading of the indicator when the springs are placed under load and this will be true for all loads and all variations of temperatures.

The detail features of construction are fully described and claimed in my co-pending application filed of even date herewith Serial No. 368,856.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. In a spring scale, the combination of a load spring, an indicator, operating means for the indicator composed of homogeneous material and extending to both sides of the point of engagement with the indicator whereby the contraction and expansion longitudinally of the operating means under temperature changes will automatically correct the reading of the indicator for the changing length of the wire of the spring, caused by the changes in temperature, and substantially compensate for changes in the stiffness of the spring due to changes in temperature.

2. In a spring scale, the combination of a load spring, a rotatable indicator, indicator operating means composed of homogeneous material and extending to both sides of its engagement with the rotatable indicator, said operating means having a high coefficient of expansion for automatically correcting the reading of the indicator for the changes in length of the wire of the spring and substantially compensating for changes in the stiffness of the spring due to changes in temperature.

3. In a spring scale, the combination of a load spring, an indicator, and an indicator operating element composed of homogeneous material having a substantially higher coefficient of expansion than the spring of the scale for automatically correcting the reading of the indicator for the changes in the length of wire in the spring and substantially compensating for changes in the stiffness of the spring due to changes in temperature.

4. In a spring scale, the combination of a load spring, an indicator, and a single indicator operating element of homogeneous material extending to both sides of the point of engagement of said element with the indicator and adapted to operate to correct the zero reading of the indicator and substantially compensate for the indicator error due to changes in stiffness of the spring due to temperature.

5. In a spring scale, the combination of an indicator, a pinion mounted on a shaft carrying the indicator, a runner suspended on the spring of the scale, a rack composed of homogeneous material so pivoted on said runner and meshed with said pinion and having such a co-efficient of expansion as will operate the indicator to substantially compensate the reading of the indicator for changes in the length and stiffness of the springs due to temperature changes.

6. In a spring scale, the combination of a spring with an indicator and indicator operating means composed of homogeneous material having a higher co-efficient of expansion than that of the spring material adapted by its longitudinal expansion and contraction to correct error in the reading of the indicator for changes in length and substantially compensate for errors due to changes in stiffness of the springs due to temperature changes.

In testimony whereof I affix my signature.

SYLVESTER G. AVERELL.